(12) United States Patent
Kimura

(10) Patent No.: US 8,335,644 B2
(45) Date of Patent: Dec. 18, 2012

(54) NAVIGATION APPARATUS AND GUIDE ROUTE SEARCH METHOD FOR CHANGING A SEARCH CONDITION OF A USER-SELECTED ROAD SELECTION

(75) Inventor: Tsuyoshi Kimura, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 351 days.

(21) Appl. No.: 12/730,017

(22) Filed: Mar. 23, 2010

(65) Prior Publication Data

US 2011/0029230 A1 Feb. 3, 2011

(30) Foreign Application Priority Data

Jul. 28, 2009 (JP) ................................ 2009-175845

(51) Int. Cl.
*G01C 21/34* (2006.01)
(52) U.S. Cl. ........ 701/414; 701/118; 701/416; 701/423; 701/533; 340/995.13; 340/995.17; 340/995.19
(58) Field of Classification Search .......... 701/117–119, 701/408–416, 423–426, 532, 533; 340/988, 340/995.1–995.19, 995.2–995.27
See application file for complete search history.

(56) References Cited

U.S. PATENT DOCUMENTS

| | | | | |
|---|---|---|---|---|
| 5,787,383 A | * | 7/1998 | Moroto et al. ................. | 701/418 |
| 5,878,368 A | * | 3/1999 | DeGraaf ........................ | 701/411 |
| 5,911,773 A | * | 6/1999 | Mutsuga et al. .............. | 701/414 |
| 6,061,629 A | * | 5/2000 | Yano et al. .................... | 701/425 |
| 6,297,748 B1 | * | 10/2001 | Lappenbusch et al. ........ | 340/905 |
| 6,622,082 B1 | * | 9/2003 | Schmidt et al. ............... | 340/905 |
| 6,760,661 B2 | * | 7/2004 | Klein et al. ................... | 701/117 |
| 6,882,931 B2 | * | 4/2005 | Inoue ............................. | 701/533 |
| 6,895,331 B2 | * | 5/2005 | Yoshida ........................ | 701/533 |
| 6,904,362 B2 | * | 6/2005 | Nakashima et al. .......... | 701/421 |
| 6,950,743 B2 | * | 9/2005 | Kainuma et al. ............. | 701/532 |
| 6,983,204 B2 | * | 1/2006 | Knutson ........................ | 701/414 |
| 6,988,035 B2 | * | 1/2006 | Slickers ........................ | 701/410 |
| 7,099,773 B2 | * | 8/2006 | Linn .............................. | 701/414 |
| 7,103,474 B1 | * | 9/2006 | Asahara et al. ............... | 701/414 |
| 7,161,504 B2 | * | 1/2007 | Linn ........................ | 340/995.13 |
| 7,400,973 B2 | * | 7/2008 | Okochi ......................... | 701/533 |
| 7,865,304 B2 | * | 1/2011 | Gretton et al. ................ | 701/418 |

(Continued)

FOREIGN PATENT DOCUMENTS

| | | | |
|---|---|---|---|
| JP | 2002243480 | * | 8/2002 |
| JP | 2004226168 | * | 8/2004 |
| JP | 2006-322781 A2 | | 11/2006 |
| WO | WO2005088255 | * | 9/2005 |

*Primary Examiner* — Russell Frejd

(74) *Attorney, Agent, or Firm* — Brinks Hofer Gilson & Lione

(57) ABSTRACT

A traffic jam guide image showing traffic jam conditions of a plurality of road sections ahead of a current location of a vehicle is displayed together with a map image during a guidance of a guide route from the current location to a destination. Based on a user operation performed on a touch screen, an object road section in which a search condition is to be changed and the search condition in the object road section are set. A second guide route from the current location to the destination is searched for based on the search condition set for the object road section such that the user has only to perform a simple operation through a touch screen to automatically change the search condition and set the road section to which the changed search condition is applied.

12 Claims, 9 Drawing Sheets

U.S. PATENT DOCUMENTS

2007/0005233 A1* 1/2007 Pinkus et al. ................. 701/200
2007/0106466 A1 5/2007 Noguchi
2008/0306683 A1* 12/2008 Ando et al. ................... 701/207
2009/0143971 A1* 6/2009 Carruthers et al. ........... 701/200

* cited by examiner

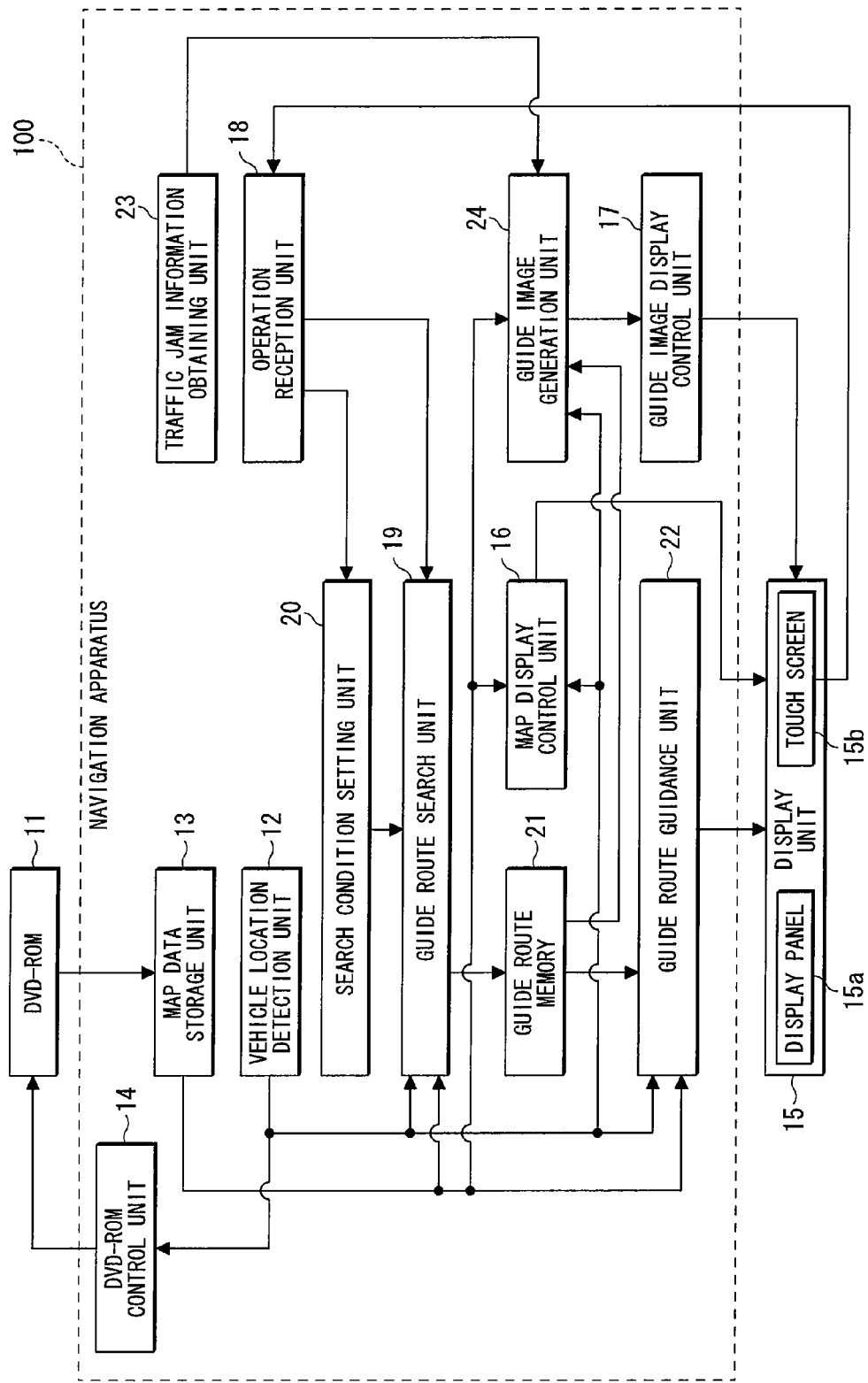

EXAMPLES ILLUSTRATING TRACING OPERATION PERFORMED ON
TOUCH SCREEN ACCORDING TO FIRST EMBODIMENT

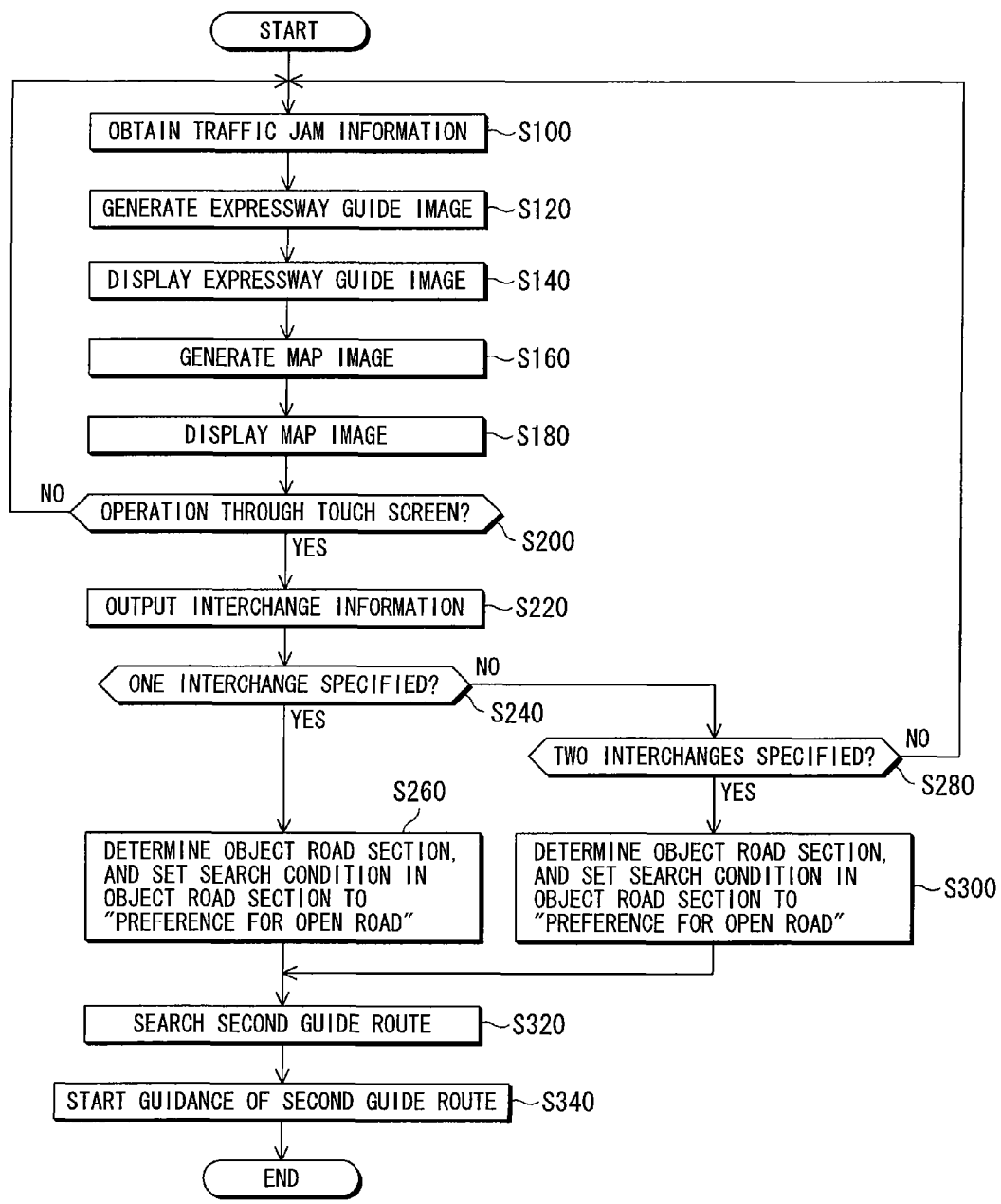

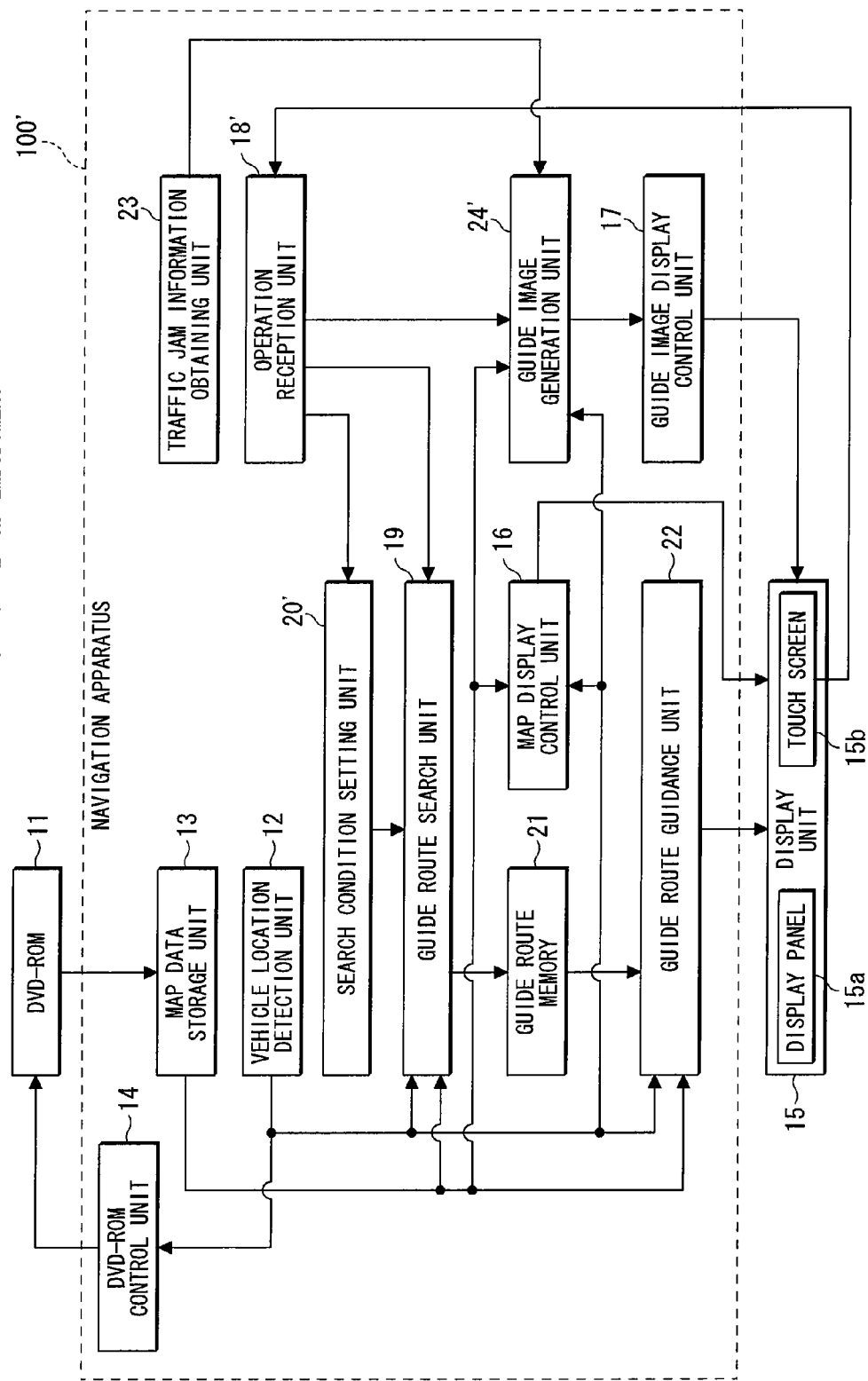

SCHEMATICS ILLUSTRATING EXAMPLE OF PROCESS OF GENERATING
EXPRESSWAY GUIDE IMAGE ACCORDING TO SECOND EMBODIMENT

EXAMPLES ILLUSTRATING TRACING OPERATION PERFORMED ON
TOUCH SCREEN ACCORDING TO SECOND EMBODIMENT

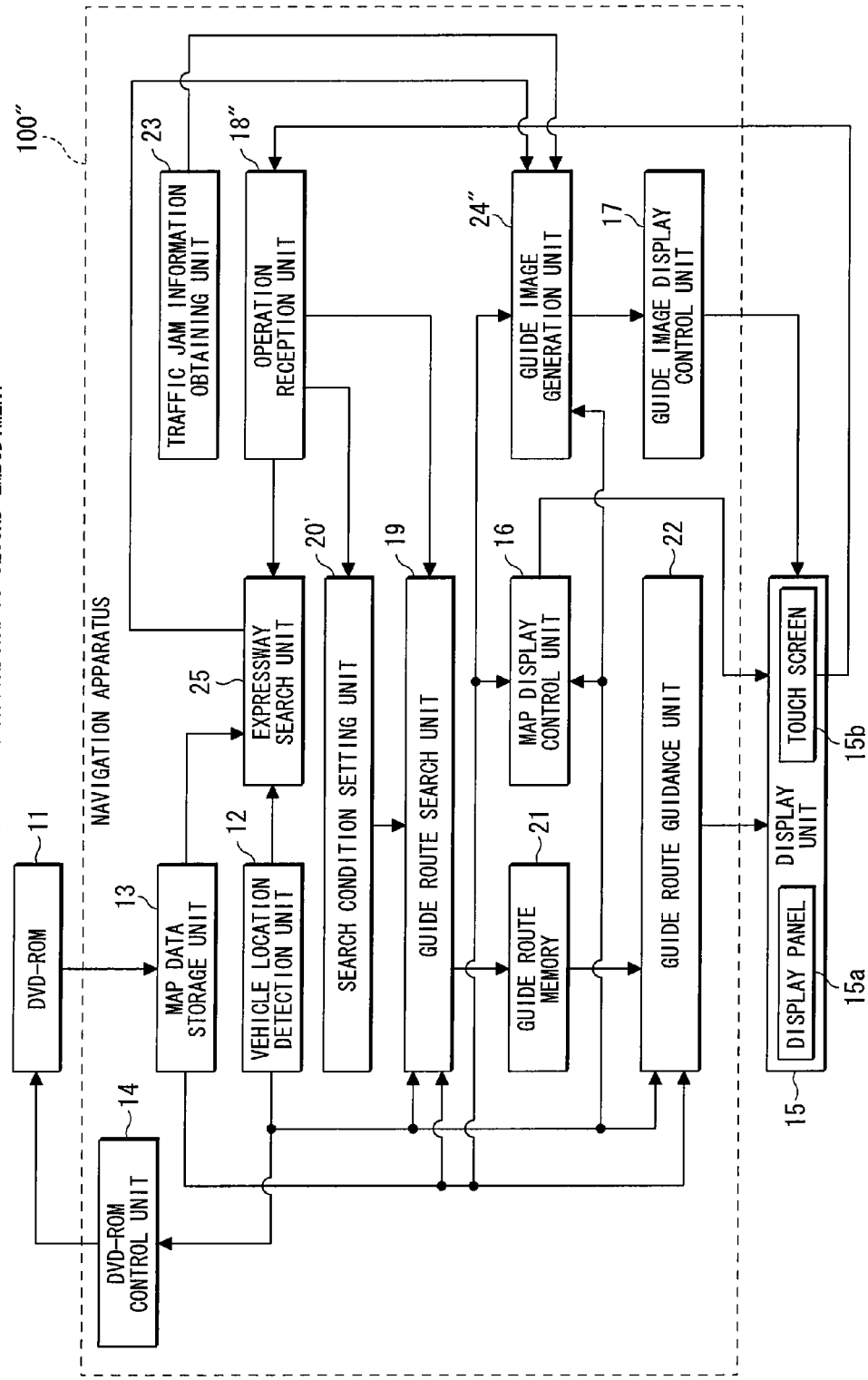

SCHEMATICS ILLUSTRATING EXEMPLARY MODIFICATION OF EXPRESSWAY
GUIDE IMAGE ACCORDING TO FIRST AND SECOND EMBODIMENTS

NAVIGATION APPARATUS AND GUIDE ROUTE SEARCH METHOD FOR CHANGING A SEARCH CONDITION OF A USER-SELECTED ROAD SELECTION

RELATED APPLICATIONS

The present application claims priority to Japanese Patent Application Serial Number 2009-175845, filed Jul. 28, 2009, the entirety of which is hereby incorporated by reference.

BACKGROUND OF THE INVENTION

1. Field of the Invention

The present invention relates to a navigation apparatus and a guide route search method suitable to be applied to, for example, a navigation apparatus configured to change a currently shown guide route to a destination.

2. Description of the Related Art

A typical on-vehicle navigation apparatus detects a current location of a vehicle using a dead reckoning sensor or a global positioning system (GPS) receiver, reads map data of the surrounding area from a recording medium, and displays the map data on a screen. A vehicle location mark indicative of the vehicle location is superimposed at a predetermined point on the screen so that the current location of the vehicle can be recognized at a glance.

In most cases, the navigation apparatus includes a route guide function for allowing a driver to easily travel to a desired destination without taking a wrong route. The route guide function includes automatically searching for a route from a current location to the destination with the least cost using the map data, and drawing the searched route on a map screen as a guide route using a different color and a thicker line. The function also includes an intersection guidance of displaying an enlargement of an intersection when the vehicle approaches the intersection to be guided on the guide route within a certain distance, thereby guiding the driver to the destination.

Some navigation apparatuses also include a guide route change function for changing the guide route while guiding the driver to the destination. Such a navigation apparatus can change the currently shown guide route to another guide route to avoid a traffic jam by using the guide route change function when, for example, an accidental traffic jam is caused by an accident, a road construction, a stopped vehicle, or the like ahead of the vehicle while travelling the guide route.

There is disclosed a technology of correcting a part of a route specified before by a user and setting the corrected route as a new route by the user tracing a road on the road map displayed on a display monitor (see, for example, Japanese Patent Application Publication No. 2006-322781).

BRIEF DESCRIPTION OF THE INVENTION

However, with the guide route change function in the past, an operation to search for the guide route has to be performed again after displaying a guide route menu for confirming and editing the guide route on the display screen by operating through menu buttons or the like, and performing an operation to add or delete a stopover point through the guide route menu or to change the route search condition. Thus, the operation to change the currently shown guide route to the other guide route intended by the user is disadvantageously complicated and troublesome.

Even with the technology disclosed in Japanese Patent Application Publication No. 2006-322781, the entire road to be deleted has to be traced on the route specified before, and then another road that replaces the deleted road has to be thoroughly traced. Thus, the operation to correct a part of the route is disadvantageously complicated and troublesome.

Systems described in the present application have been made to solve the issues described above, and it is an object of systems described in the present application to easily change the currently shown guide route to another guide route preferred by the user without a troublesome operation performed by the user.

To solve the above issues, according to an aspect of systems described in the present application, during a guidance of the guide route from the current location of the vehicle to the destination, a traffic jam guide image showing traffic jam conditions of a plurality of road sections ahead of the current location in the order of closeness to the current location is displayed together with a map image. Based on the user operation performed on a touch screen when the map image and the traffic jam guide image are displayed thereon, an object road section in which the search condition is to be changed and the search condition in the object road section are set, and the second guide route from the current location to the destination is searched for according to the search condition set for the object road section.

According to an aspect of systems described in the present application configured as above, the user has only to perform a simple operation through the touch screen, thereby automatically changing the search condition and setting the road section to which the changed search condition is applied. Accordingly, without performing such a troublesome user operation as with the guide route change function in the past, the currently shown guide route can be easily changed to the other guide route preferred by the user by the simple operation.

BRIEF DESCRIPTION OF THE DRAWINGS

FIG. 1 is a block diagram showing an exemplary functional configuration of one embodiment of a navigation apparatus;

FIG. 3 is a flowchart of an exemplary operation of the navigation apparatus according to the embodiment of FIG. 1;

FIG. 4 is a block diagram showing an exemplary functional configuration of another embodiment of a navigation apparatus;

FIG. 8 is a block diagram showing an exemplary modification of the functional configuration of the navigation apparatus according to the embodiment of FIG. 4.

DETAILED DESCRIPTION OF THE INVENTION

Figure 2A:
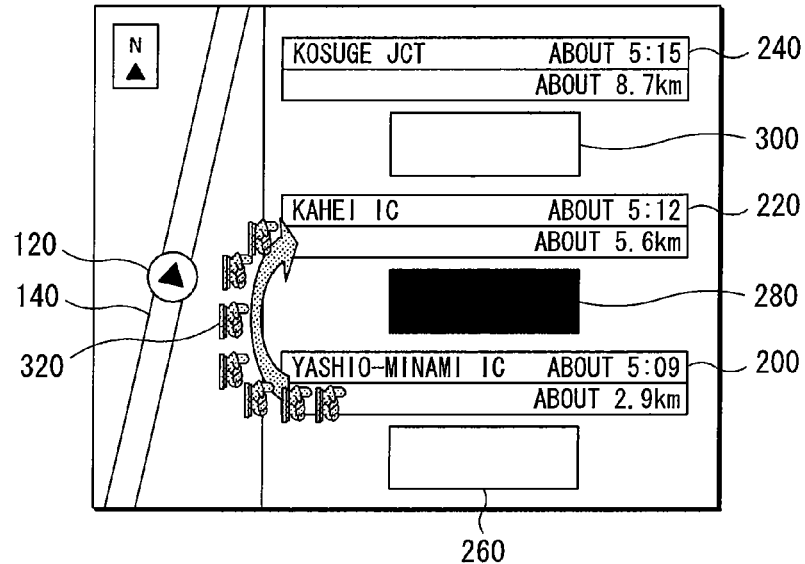
FIGS. 2(a) and 2(b) illustrate examples of a tracing operation performed on a touch screen according to the embodiment of FIG. 1.

FIG. 1 is a block diagram showing an exemplary functional configuration of one embodiment of a navigation apparatus 100. In FIG. 1, a reference numeral 11 denotes a recording medium such as a digital versatile disc read only memory (DVD-ROM), which stores therein various types of map data used for a map display and a route search. The map data stored in the DVD-ROM 11 is managed by stratifying it into a unit called a level varying from a higher-level map for viewing a large area (a small-scale map) to a lower-level map describing a small area in detail (a large-scale map). The map data in each level includes data in drawing units required for the map display (various types of data about roads, buildings, and institutions present on the map) as well as data in road units required for various processings such as a map matching and the route search. Although the DVD-ROM 11 is used herein as the recording medium that stores therein the map data and institution information, other recording media such as a compact disc read only memory (CD-ROM), a hard disk, and a semiconductor memory can be used alternatively.

A reference numeral 12 denotes a vehicle location detection unit that detects a current location of a vehicle at predetermined intervals, and includes a dead reckoning sensor, a global positioning system (GPS) receiver, and a central processing unit (CPU) for location computation. The dead reckoning sensor includes a vehicle speed sensor (distance sensor) that detects a travel distance of the vehicle by outputting a single pulse at every predetermined travel distance and an angular velocity sensor (relative orientation sensor) such as a vibration gyro that detects a rotation angle (travel orientation) of the vehicle. The dead reckoning sensor detects the relative location and the relative orientation of the vehicle using the vehicle speed sensor and the angular velocity sensor.

The CPU for location computation computes an absolute vehicle location (estimated vehicle location) and an absolute vehicle orientation (estimated vehicle orientation) based on the data about the relative location and the relative orientation of the vehicle output from the dead reckoning sensor. The GPS receiver receives radio waves transmitted from a plurality of GPS satellites using a GPS antenna, and computes the absolute location and the absolute orientation of the vehicle by performing a three-dimensional positioning process or a two-dimensional positioning process (the vehicle orientation is computed based on the vehicle location at the present time point and the vehicle location one sampling time period $\Delta T$ before).

A reference numeral 13 denotes a map data storage unit that temporarily stores therein the map data read from the DVD-ROM 11 based on a control performed by a DVD-ROM control unit 14. The DVD-ROM control unit 14 controls a readout of the map data from the DVD-ROM 11. In other words, the DVD-ROM control unit 14 inputs information about the current location of the vehicle from the vehicle location detection unit 12 and outputs an instruction to read the map data of a predetermined area including the current location of the vehicle, thereby reading the map data required for the map display and the search for a guide route from the DVD-ROM 11 and storing the map data in the map data storage unit 13.

A reference numeral 15 denotes a display unit that includes a display panel 15a and a touch screen 15b. The display panel 15a displays a map image based on data output from a map display control unit 16. The display panel 15a also displays a guide route image based on data output from a guide route guidance unit 22 as well as it displays the map image based on the data output from the map display control unit 16 while showing the guide route from the current location of the vehicle to a destination. Furthermore, in a case where an expressway is included in the guide route, the display panel 15a displays an expressway guide image (corresponding to a traffic jam guide image according to an aspect of the present invention) based on data output from a guide image display control unit 17 while travelling on the expressway.

The touch screen 15b is interposed on a front surface of the display panel 15a and detects a touch operation and a tracing operation performed by a user. The tracing operation means an operation in which the user touches the touch screen 15b and moves his/her finger without leaving from the touch screen 15b.

A reference numeral 18 denotes an operation reception unit that receives an operation performed on the touch screen 15b by the user. For example, the operation reception unit 18 receives an operation to set the destination of the guide route. The destination can be set by scrolling the map image and pointing a desired spot with a cursor or by registering a spot searched by inputting a keyword such as an institution name, a spot name, a telephone number, an address, and a zip code to a menu screen. The operation reception unit 18 then outputs destination information indicative of the destination set by the received operation to a guide route search unit 19.

The operation reception unit 18 also receives the operation performed on the touch screen 15b by the user when the map image and the expressway guide image are displayed on the display panel 15a (i.e., when the guide route is shown while travelling on the expressway). Specifically, the operation reception unit 18 receives a tracing operation to select a road section by specifying any one or two of interchanges displayed on the expressway guide image as information. The operation reception unit 18 then outputs the information received through the tracing operation (interchange information indicative of the specified interchange(s)) to a search condition setting unit 20.

Figure 2B:
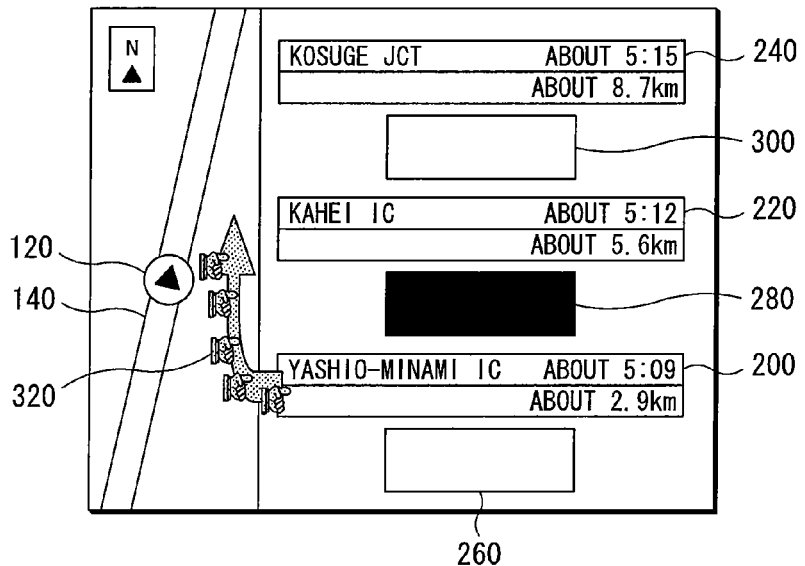

FIGS. 2(a) and 2(b) illustrate examples of the tracing operation performed on the touch screen 15b (FIG. 1). In FIGS. 2(a) and 2(b), the left half of the screen displays the map image of the area surrounding the vehicle location based on the map image data output from the map display control unit 16. In the map image, a reference numeral 120 denotes a vehicle location mark, and 140 denotes the expressway included in the guide route on which the vehicle is travelling.

The right half of the screen displays the expressway guide image based on expressway guide image data output from the guide image display control unit 17. In the expressway guide image, reference numerals 200, 220, and 240 denote spot name display areas of a plurality of interchanges and junctions (referred to below simply as the interchanges) on the expressway included in the guide route arranged in the order of the closeness to the current location. The spot name display area 200 indicates a name of the interchange closest to the vehicle location ("Yashio-Minami" in the example shown in FIGS. 2(a) and 2(b)), an estimated time to reach there, and a distance from the current location as information. The spot name display area 220 indicates the name of the interchange second closest to the vehicle location ("Kahei" in the example shown in FIGS. 2(a) and 2(b)), the estimated time to reach there, and the distance from the current location as information. The spot name display area 240 indicates the name of the interchange third closest to the vehicle location ("Kosuge" in the example shown in FIGS. 2(a) and 2(b)), the estimated time to reach there, and the distance from the current location as information.

In the expressway guide image, a reference numeral 260 denotes a traffic jam condition display area indicative of a traffic jam condition in the road section from the current location to Yashio-Minami interchange ("smooth" in the example shown in FIGS. 2(a) and 2(b)). A reference numeral 280 denotes a traffic jam condition display area indicative of the traffic jam condition in the road section from Yashio- Minami interchange to Kahei interchange ("jammed" in the example shown in FIGS. 2(a) and 2(b)). A reference numeral 300 denotes a traffic jam condition display area indicative of the traffic jam condition in the road section from Kahei interchange to Kosuge interchange ("smooth" in the example shown in FIGS. 2(a) and 2(b)).

FIG. 2(a) illustrates how two interchanges (Yashio-Minami interchange and Kahei interchange in the example shown in FIG. 2(a)) on an expressway 140 included in the guide route are specified to select the road section between them by the tracing operation following an arrow shown in FIG. 2(a) with a user's finger 320. The user performs the tracing operation as shown in FIG. 2(a) when he/she wants to exit the expressway at Yashio-Minami interchange and enter the expressway again at Kahei interchange because the traffic in the road section from Yashio-Minami interchange to Kahei interchange is jammed. In this case, the operation reception unit 18 outputs the interchange information indicative of the two interchanges specified by the received tracing operation to the search condition setting unit 20.

FIG. 2(b) illustrates how a single interchange (Yashio-Minami interchange in the example shown in FIG. 2(b)) on the expressway 140 included in the guide route is specified to select the road section from there to the destination by the tracing operation following an arrow shown in FIG. 2(b) with the user's finger 320. The user performs the tracing operation as shown in FIG. 2(b) when he/she wants to exit the expressway at Yashio-Minami interchange and travel on an open road to the destination because the traffic in the road section from Yashio-Minami interchange to Kahei interchange is jammed. In this case, the operation reception unit 18 outputs the interchange information indicative of the single interchange specified by the received tracing operation to the search condition setting unit 20.

When the interchange information is output from the operation reception unit 18 and the interchange information indicates two interchanges, the search condition setting unit 20 determines the road section between the specified two interchanges as an object road section in which the search condition is to be changed, and sets the search condition in the determined object road section to prefer open roads. The search condition setting unit 20 then outputs search condition information indicative of the set object road section and the search conditions in the object road section to the guide route search unit 19.

Furthermore, when the interchange information is output from the operation reception unit 18 and the interchange information indicates a single interchange, the search condition setting unit 20 determines the road section from the specified interchange to the destination as the object road section, and sets the search condition in the determined object road section to prefer open roads. The search condition setting unit 20 then outputs the search condition information indicative of the set object road section and the search condition in the object road section to the guide route search unit 19.

The guide route search unit 19 searches for the guide route from the vehicle location indicated by vehicle location information to the destination indicated by the destination information output from the operation reception unit 18 based on the vehicle location information detected by the vehicle location detection unit 12 and the map data stored in the map data storage unit 13. Furthermore, when the search condition information is output from the search condition setting unit 20, the guide route search unit 19 searches for a second guide route from the vehicle location to the destination after changing the search condition in the object road section in accordance with the search condition indicated by the search condition information (the search condition remains the same except for the object road section).

A reference numeral 21 denotes a guide route memory that temporarily stores therein, when the guide route is searched by the guide route search unit 19, the data of the searched route (a group of nodes from the current location to the destination) as guide route information. Furthermore, when the guide route search unit 19 searches for the second guide route, the guide route memory 21 temporarily stores therein the data of the searched second guide route (a group of nodes from the current location to the destination) as second guide route information.

The map display control unit 16 generates map image data of an area surrounding the vehicle location based on the vehicle location information detected by the vehicle location detection unit 12 and the map data stored in the map data storage unit 13. The map display control unit 16 then outputs the generated map image data to the display panel 15a of the display unit 15.

The guide route guidance unit 22 performs a guide route guidance based on the vehicle location information detected by the vehicle location detection unit 12, the map data stored in the map data storage unit 13, and the guide route information stored in the guide route memory 21. Specifically, the guide route guidance unit 22 performs a guidance of the guide route to the destination by displaying the guide route with a thick line in a color different from that of other roads interposed on the map image generated by the map display control unit 16.

Furthermore, when the second guide route is searched by the guide route search unit 19, the guide route guidance unit 22 performs the guide route guidance based on the vehicle location information detected by the vehicle location detection unit 12, the map data stored in the map data storage unit 13, and the second guide route information stored in the guide route memory 21. Specifically, the guide route guidance unit 22 performs the guidance of the second guide route to the destination by displaying the second guide route with a thick line in a color different from that of other roads interposed on the map image generated by the map display control unit 16.

A reference numeral 23 denotes a traffic jam information obtaining unit that obtains vehicle information and communication system (VICS) information (road traffic information including traffic jam information and regulation information; VICS is a registered trademark) from, for example, the Japan Road Traffic Information Center (not shown) by performing a bidirectional communication with radio wave beacon transceivers provided generally on expressways through radio waves and performing the bidirectional communication with optical beacon transceivers provided generally on open roads through light waves. The traffic jam information obtaining unit 23 then outputs the traffic jam information included in the VICS information obtained from, for example, the Japan Road Traffic Information Center to a guide image generation unit 24.

The traffic jam information included in the VICS information is indicative of a degree of a traffic jam in a specific point of a certain VICS link, and it includes such information as a VICS link ID, a length of the traffic jam, and the degree of the traffic jam. The VICS link ID indicates an identification number of a link corresponding to the road. The length of the traffic jam indicates a distance from a start point (one end of the VICS link) of the traffic jam. The degree of the traffic jam identifies, for example, three conditions including "smooth" where a vehicle can travel smoothly, "heavy" where the vehicle can travel at a speed lower than a predetermined level, and "jammed" where the vehicle can hardly move.

The guide image generation unit 24 determines whether the vehicle is travelling on the expressway along the guide route based on the vehicle location information detected by the vehicle location detection unit 12 and the guide route information stored in the guide route memory 21. When it is determined that the vehicle is travelling on the expressway along the guide route, the guide image generation unit 24 generates the expressway guide image data showing the traffic jam conditions of a plurality of road sections ahead of the current location (according to the embodiment, the road sections among a plurality of interchanges on the expressway included in the guide route) in the order of closeness to the current location based on the vehicle location information detected by the vehicle location detection unit 12, the map data stored in the map data storage unit 13, the second guide route information stored in the guide route memory 21, and the traffic jam information output from the traffic jam information obtaining unit 23. The guide image display control unit 17 outputs the expressway guide image data generated by the guide image generation unit 24 to the display panel 15a of the display unit 15. The map display control unit 16 and the guide image display control unit 17 may correspond to a display control unit.

Given below is an explanation about an operation of the navigation apparatus 100 of FIG. 1. FIG. 3 is a flowchart of an exemplary operation of the navigation apparatus 100 in a case where the vehicle is travelling on the expressway along the guide route toward the destination.

First, the traffic jam information obtaining unit 23 obtains the VICS information from, for example, the Japan Road Traffic Information Center (not shown) (Step S100). The traffic jam information obtaining unit 23 then outputs the traffic jam information included in the VICS information obtained from, for example, the Japan Road Traffic Information Center to the guide image generation unit 24.

The guide image generation unit 24 then generates the expressway guide image data based on the vehicle location information detected by the vehicle location detection unit 12, the map data stored in the map data storage unit 13, the second guide route information stored in the guide route memory 21, and the traffic jam information output from the traffic jam information obtaining unit 23 (Step S120). The guide image display control unit 17 outputs the expressway guide image data generated by the guide image generation unit 24 to the display unit 15 to display the expressway guide image on the display panel 15a (Step S140).

The map display control unit 16 then generates the map image data of the area surrounding the vehicle location based on the vehicle location information detected by the vehicle location detection unit 12 and the map data stored in the map data storage unit 13 (Step S160). The map display control unit 16 outputs the generated map image data to the display unit 15 to display the map image on the display panel 15a (Step S180).

Next, the operation reception unit 18 determines whether an operation is performed on the touch screen 15b by the user (Step S200). When the operation reception unit 18 determines that the operation is not performed on the touch screen 15b by the user (NO at Step S200), the process moves to Step S100. On the other hand, when the operation reception unit 18 determines that the operation is performed on the touch screen 15b by the user (YES at Step S200), the operation reception unit 18 outputs the interchange information indicative of the interchange specified by the tracing operation performed on the touch screen 15b by the user to the search condition setting unit 20 (Step S220).

Next, the search condition setting unit 20 determines whether there is one interchange indicated by the interchange information output from the operation reception unit 18 (Step S240). When the search condition setting unit 20 determines that there is one interchange indicated by the interchange information (YES at Step S240), the search condition setting unit 20 determines the road section from the specified interchange to the destination to be the object road section, and sets the search condition in the determined object road section to prefer open roads (Step S260). The search condition setting unit 20 then outputs the search condition information indicative of the set object road section and the search condition in the object road section to the guide route search unit 19. The process then moves to Step S320.

On the other hand, when the search condition setting unit 20 does not determine that there is one interchange indicated by the interchange information (NO at Step S240), the search condition setting unit 20 determines whether there are two interchanges indicated by the interchange information (Step S280). When the search condition setting unit 20 determines that there are two interchanges indicated by the interchange information (YES at Step S280), the search condition setting unit 20 determines the road section between the two specified interchanges to be the object road section, and sets the search condition in the determined object road section to prefer open roads (Step S300). The search condition setting unit 20 then outputs the search condition information indicative of the set object road section and the search condition in the object road section to the guide route search unit 19. The process then moves to Step S320.

On the other hand, when the search condition setting unit 20 does not determine that there are two interchanges indicated by the interchange information (NO at Step S280), the process moves to Step S100. At Step S320, the guide route search unit 19 changes the search condition in the object road section in accordance with the search condition indicated by the search condition information output from the search condition setting unit 20, and searches for the second guide route from the vehicle location to the destination (Step S320). At last, the guide route guidance unit 22 starts the guidance of the second guide route based on the vehicle location information detected by the vehicle location detection unit 12, the map data stored in the map data storage unit 13, and the second guide route information stored in the guide route memory 21 (Step S340). By completing the process at Step S340, the navigation apparatus 100 terminates the process shown in FIG. 3.

As explained above in detail, according to the first embodiment, the expressway guide image showing the traffic jam conditions of road sections among a plurality of interchanges ahead of the current location in the order of closeness to the current location is displayed together with the map image during the guidance of the expressway included in the guide route from the current location of the vehicle to the destination. Then, based on the tracing operation performed on the touch screen 15b by the user while the map image and the expressway guide image are displayed, the search condition in the object road section for which the search condition used to search for the second guide route from the current location to the destination is set, and the second guide route is searched according to the set search condition.

According to the first embodiment configured as above, the change of the search condition and the setting of the road section to which the changed search condition is applied can be automatically performed by the user only performing the simple operation on the touch screen 15b (the tracing operation to specify an interchange) while watching the expressway guide image automatically displayed during the travel on the expressway. Thus, without performing such a troublesome user operation as with the guide route change function in the past, the guide route preferred by the user can be searched for, and the currently shown guide route can be changed to the preferred guide route by the simple operation.

FIG. 4 is a block diagram showing an exemplary functional configuration of another embodiment of a navigation apparatus 100'. As shown in FIG. 4, the navigation apparatus 100' includes an operation reception unit 18', a search condition setting unit 20', and a guide image generation unit 24' respectively as the functional configuration instead of the operation reception unit 18, the search condition setting unit 20, and the guide image generation unit 24 shown in FIG. 1. In FIG. 4, the constituents denoted by the same reference numerals as in FIG. 1 have the same functions as those shown in FIG. 1, and therefore, the explanation thereof is omitted.

The operation reception unit 18' receives an operation performed on the touch screen 15b by the user. For example, the operation reception unit 18' receives an operation to set the destination of the guide route. The operation reception unit 18' then outputs the destination information indicative of the destination set by the received operation to the guide route search unit 19.

The operation reception unit 18' also receives an operation to select any one of a plurality of expressways during the guide route guidance on an open road. Specifically, the operation reception unit 18' receives the operation to select any one of the expressways by the operation performed on the touch screen 15b by the user in a state where a list of the plurality of expressways is displayed on a display screen in response to the user's request (the operation to request selection of the expressway). The operation reception unit 18' then outputs the expressway information indicative of the expressway selected by the received operation to the guide image generation unit 24'. When the expressway information is output to the guide image generation unit 24', the expressway guide image is displayed on the display panel 15a as described later. The operation reception unit 18' corresponds to an expressway selection operation receiving unit according to the present invention.

The operation reception unit 18' also receives the operation performed on the touch screen 15b by the user when the map image and the expressway guide image are displayed on the display panel 15a. Specifically, the operation reception unit 18' receives a tracing operation to select a road section by specifying any one or two of interchanges displayed on the expressway guide image as information. The operation reception unit 18' then outputs the information received through the tracing operation (interchange information indicative of the specified interchange(s)) to the search condition setting unit 20'.

When the expressway information is output from the operation reception unit 18', the guide image generation unit 24' generates the expressway guide image data showing the traffic jam conditions of a plurality of road sections ahead of the current location (according to the embodiment, the road sections among a plurality of interchanges on the expressway indicated by expressway information) in the order of closeness to the current location based on the vehicle location information detected by the vehicle location detection unit 12, the map data stored in the map data storage unit 13, and the traffic jam information obtained by the traffic jam information obtaining unit 23. The guide image display control unit 17 outputs the expressway guide image data generated by the guide image generation unit 24' to the display unit 15 to display the expressway guide image on the display panel 15a.

Figure 5A:
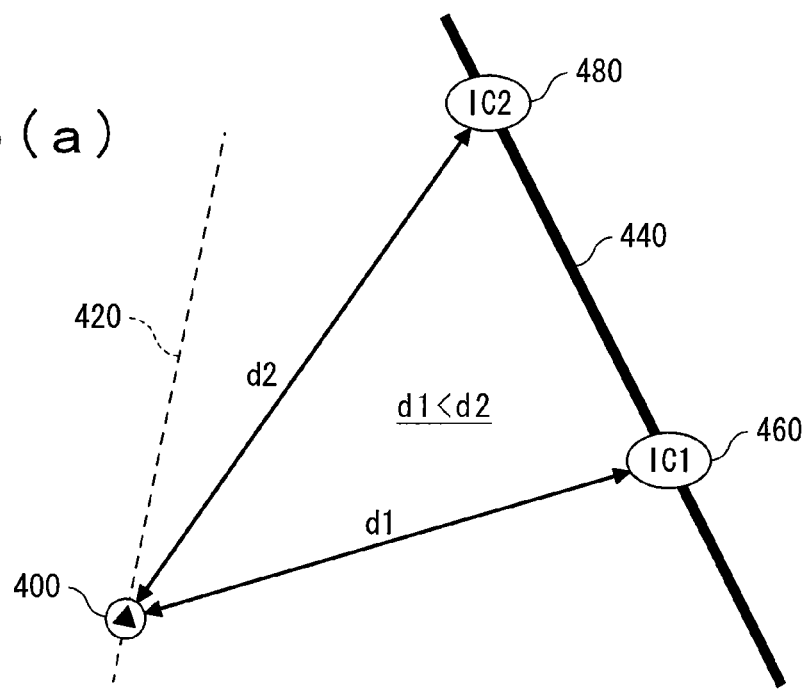
FIGS. 5(a) and 5(b) are schematics illustrating an example of a process of generating an expressway guide image according to the embodiment of FIG. 4.
Figure 5B:
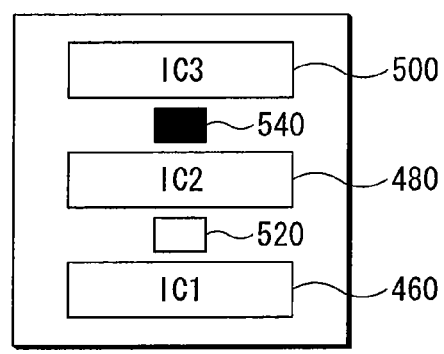

Next, an example of a process of generating the expressway guide image by the guide image generation unit 24' is explained. FIGS. 5(a) and 5(b) are schematics illustrating an example of a process of generating the expressway guide image according to the embodiment of FIG. 4. FIG. 5(a) illustrates a positional relation between the guide route from the current location of the vehicle to the destination and the expressway indicated by the expressway information output from the operation reception unit 18'. FIG. 5(b) illustrates an example of the expressway guide image generated by the guide image generation unit 24' based on the positional relation shown in FIG. 5(a).

In FIG. 5(a), a reference numeral 400 denotes a current location of the vehicle. A reference numeral 420 denotes a guide route from the current location 400 of the vehicle to a destination (not shown). A reference numeral 440 denotes an expressway indicated by the expressway information output from the operation reception unit 18'. The guide image generation unit 24' searches for an interchange closest to the current location from among interchanges on the expressway 440 based on the vehicle location information detected by the vehicle location detection unit 12 and the map data stored in the map data storage unit 13. In the example shown in FIG. 5(a), the guide image generation unit 24' searches for an interchange 460 (IC1) closest to the current location from among the interchanges on the expressway 440 (interchange 460 (IC1), interchange 480 (IC2), and the like).

Based on the search result, the guide image generation unit 24' generates an expressway guide image data showing the traffic jam conditions of road sections among a plurality of interchanges on the expressway ahead of the interchange 460 (IC1) closest to the current location (in the example shown in FIGS. 5(a) and 5(b), a road section 520 between the interchange 460 (IC1) and the interchange 480 (IC2) and a road section 540 between the interchange 480 (IC2) and an interchange 500 (IC3)) in the order of closeness to the current location.

When the interchange information is output from the operation reception unit 18' and the interchange information indicates two interchanges, the search condition setting unit 20' determines the road section between the two specified interchanges to be the object road section, and sets the search condition in the object road section to prefer expressways. The search condition setting unit 20' then outputs the search condition information indicative of the set object road section and the search condition in the object road section to the guide route search unit 19.

When the interchange information is output from the operation reception unit 18' and the interchange information indicates one interchange, the search condition setting unit 20' determines the road section from the specified interchange to the destination to be the object road section, and sets the search condition in the object road section to prefer expressways. The search condition setting unit 20' then outputs the search condition information indicative of the set object road section and the search condition in the object road section to the guide route search unit 19.

Figure 6A:
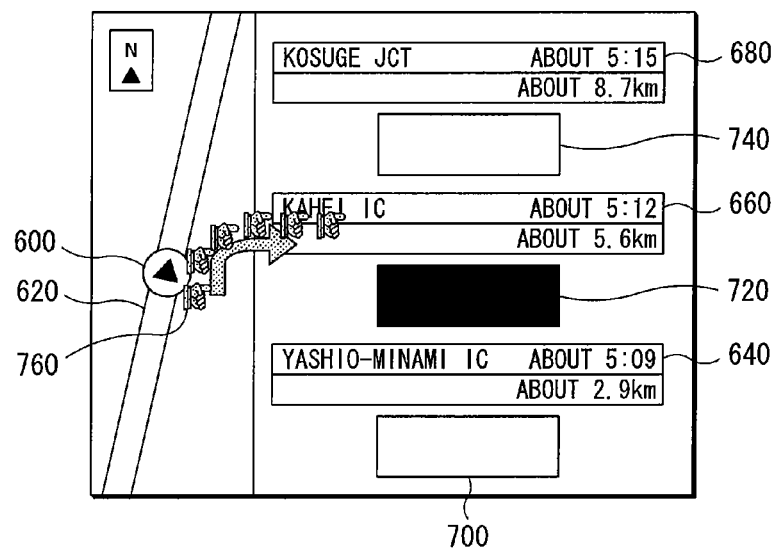
FIGS. 6(a) and 6(b) illustrate examples of a tracing operation performed on the touch screen according to the embodiment of FIG. 4.
Figure 6B:
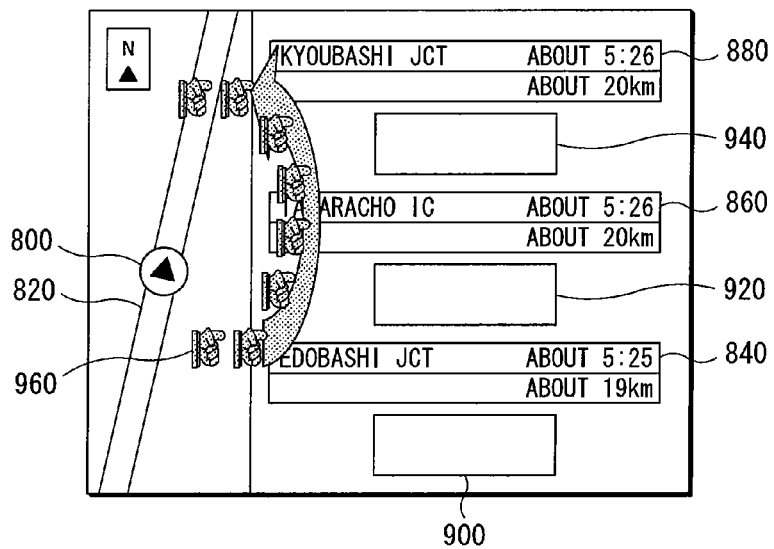

FIGS. 6(a) and 6(b) illustrate examples of a tracing operation performed on the touch screen 15b of the navigation device 100' (FIG. 1). In FIGS. 6(a) and 6(b), the left half of the screen displays the map image of the area surrounding the vehicle location based on the map image data output from the map display control unit 16. In the map image, a reference numeral 600 denotes a vehicle location mark, and 620 denotes an open road included in the guide route and on which the vehicle is travelling.

The right half of the screen displays the expressway guide image based on the expressway guide image data output from the guide image display control unit 17. In the expressway guide image, reference numerals 640, 660, and 680 denote spot name display areas selected by the operation received by the operation reception unit 18' from among the plurality of interchanges on the expressway arranged in the order of closeness to the current location. The spot name display area 640 includes the name of the interchange closest to the vehicle location ("Yashio-Minami"), the estimated time to reach there, and the distance from the current location as information. The spot name display area 660 includes the name of the interchange second closest to the vehicle location ("Kahei"), the estimated time to reach there, and the distance from the current location as information. The spot name display area 680 indicates the name of the interchange third closest to the vehicle location ("Kosuge"), the estimated time to reach there, and the distance from the current location as information.

In the expressway guide image, a reference numeral 700 denotes a traffic jam condition display area indicative of a traffic jam condition in the road section from an interchange before Yashio-Minami interchange to Yashio-Minami interchange ("smooth" in the example shown in FIG. 6(*a*)). A reference numeral 720 denotes a traffic jam condition display area indicative of the traffic jam condition in the road section from Yashio-Minami interchange to Kahei interchange ("jammed" in the example shown in FIG. 6(*a*)). A reference numeral 740 denotes a traffic jam condition display area indicative of the traffic jam condition in the road section from Kahei interchange to Kosuge interchange ("smooth" in the example shown in FIG. 6(*a*)).

FIG. 6(*a*) illustrates how an interchange ("Kahei") on the expressway selected by the operation received by the operation reception unit 18' is specified and the road section from the interchange to the destination is specified by the tracing operation following an arrow shown in FIG. 6(*a*) with a user's finger 760. The user performs the tracing operation as shown in FIG. 6(*a*) when he/she wants to get on an expressway desired by the user to bypass a road section of an open road included in the guide route ahead of the current location because the traffic in the road section is jammed, and keep travelling on the expressway to the destination. In this case, the operation reception unit 18' outputs the interchange information indicative of the single interchange specified by the received tracing operation to the search condition setting unit 20'.

In FIG. 6(*b*), the left half of the screen displays the map image of the area surrounding the vehicle location based on the map image data output from the map display control unit 16. In the map image, a reference numeral 800 denotes a vehicle location mark, and 820 denotes an open road included in the guide route and on which the vehicle is travelling.

The right half of the screen displays the expressway guide image based on the expressway guide image data output from the guide image display control unit 17. In the expressway guide image, reference numerals 840, 860, and 880 denote spot name display areas selected by the operation received by the operation reception unit 18' from among the plurality of interchanges on the expressway arranged in the order of the closeness to the current location. The spot name display area 840 includes the name of the interchange closest to the vehicle location ("Edobashi"), the estimated time to reach there, and the distance from the current location as information. The spot name display area 860 includes the name of the interchange second closest to the vehicle location ("Takaracho"), the estimated time to reach there, and the distance from the current location as information. The spot name display area 880 indicates the name of the interchange third closest to the vehicle location ("Kyobashi"), the estimated time to reach there, and the distance from the current location as information.

In the expressway guide image, a reference numeral 900 denotes a traffic jam condition display area indicative of a traffic jam condition in the road section from an interchange before Edobashi interchange to Edobashi interchange ("smooth" in the example shown in FIG. 6(*b*)). A reference numeral 920 denotes a traffic jam condition display area indicative of the traffic jam condition in the road section from Edobashi interchange to Takaracho interchange ("smooth" in the example shown in FIG. 6(*b*)). A reference numeral 940 denotes a traffic jam condition display area indicative of the traffic jam condition in the road section from Takaracho interchange to Kyobashi interchange ("smooth" in the example shown in FIG. 6(*b*)).

FIG. 6(*b*) illustrates how two interchanges ("Edobashi" and "Kyobashi") on the expressway selected by the operation received by the operation reception unit 18' are specified and the road section between them is specified by the tracing operation following an arrow shown in FIG. 6(*b*) with a user's finger 960. The user performs the tracing operation as shown in FIG. 6(*b*) when he/she wants to get on an expressway desired by the user to bypass a road section of an open road included in the guide route ahead of the current location and exit the expressway ahead of the road section because the traffic in the road section is jammed. In this case, the operation reception unit 18' outputs the interchange information indicative of the two interchanges specified by the received tracing operation to the search condition setting unit 20'.

Figure 7:
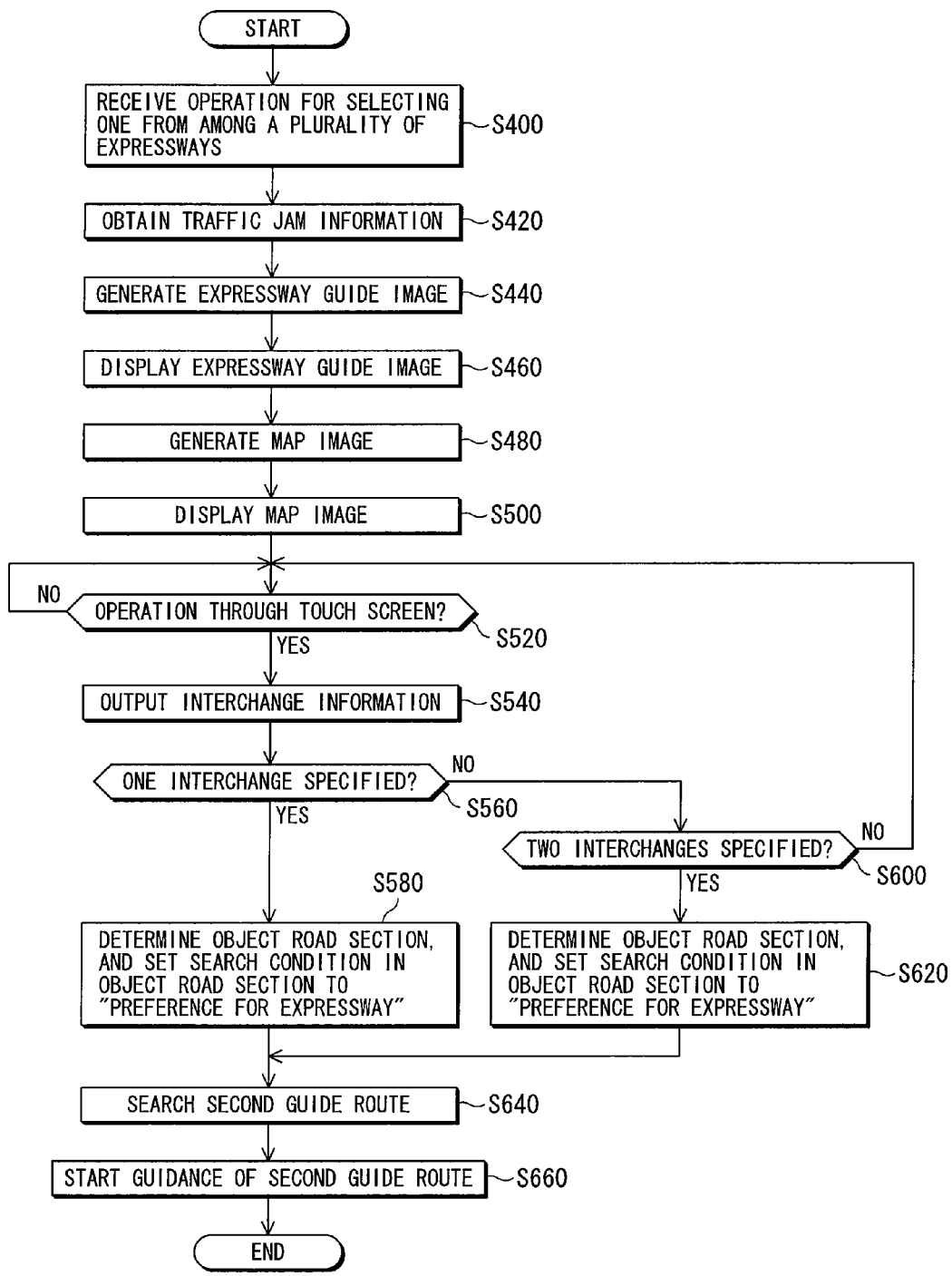
FIG. 7 is a flowchart of an exemplary operation of the navigation apparatus according to the embodiment of FIG. 4.

Given below is an explanation about an operation of the navigation apparatus 100' according to the second embodiment. FIG. 7 is a flowchart of an exemplary operation of the navigation apparatus 100' in a case where the vehicle is travelling on the open road along the guide route toward the destination.

First, the operation reception unit 18' receives an operation to select any one from among a plurality of the expressways during the guidance of the guide route on the open road (Step S400). The operation reception unit 18' then outputs the expressway information indicative of the expressway selected by the received operation to the guide image generation unit 24'.

Next, the traffic jam information obtaining unit 23 obtains the VICS information from, for example, the Japan Road Traffic Information Center (not shown) (Step S420). The traffic jam information obtaining unit 23 then outputs the traffic jam information included in the VICS information obtained from, for example, the Japan Road Traffic Information Center to the guide image generation unit 24'.

The guide image generation unit 24' then generates the expressway guide image data of the expressway selected at Step S400 based on the vehicle location information detected by the vehicle location detection unit 12, the map data stored in the map data storage unit 13, and the traffic jam information obtained by the traffic jam information obtaining unit 23 (Step S440). The guide image display control unit 17 outputs the expressway guide image data generated by the guide image generation unit 24' to the display unit 15 to display the expressway guide image on the display panel 15*a* (Step S460).

The map display control unit 16 then generates the map image data of the area surrounding the vehicle location based on the vehicle location information detected by the vehicle location detection unit 12 and the map data stored in the map data storage unit 13 (Step S480). The map display control unit 16 outputs the generated map image data to the display unit 15 to display the map image on the display panel 15*a* (Step S500).

Next, the operation reception unit 18' determines whether an operation is performed on the touch screen 15*b* by the user (Step S520). When the operation reception unit 18' determines that the operation is not performed on the touch screen 15*b* by the user (NO at Step S520), the operation reception unit 18' repeats the determination at Step S520. On the other hand, when the operation reception unit 18' determines that the operation is performed on the touch screen 15*b* by the user (YES at Step S520), the operation reception unit 18' outputs the interchange information indicative of the interchange specified by the tracing operation performed on the touch screen 15*b* by the user to the search condition setting unit 20' (Step S540).

Next, the search condition setting unit 20' determines whether there is one interchange indicated by the interchange information output from the operation reception unit 18' (Step S560). When the search condition setting unit 20' determines that there is one interchange indicated by the interchange information (YES at Step S560), the search condition setting unit 20' determines the road section from the specified interchange to the destination to be the object road section, and sets the search condition in the determined object road section to prefer expressways (Step S580). The search condition setting unit 20' then outputs the search condition information indicative of the set object road section and the search condition in the object road section to the guide route search unit 19. The process then moves to Step S640.

On the other hand, when the search condition setting unit 20' does not determine that there is one interchange indicated by the interchange information (NO at Step S560), the search condition setting unit 20' determines whether there are two interchanges indicated by the interchange information (Step S600). When the search condition setting unit 20' determines that there are two interchanges indicated by the interchange information (YES at Step S600), the search condition setting unit 20' determines the road section between the two specified interchanges to be the object road section, and sets the search condition in the determined object road section to prefer expressways (Step S620). The search condition setting unit 20' then outputs the search condition information indicative of the set object road section and the search condition in the object road section to the guide route search unit 19. The process then moves to Step S640.

On the other hand, when the search condition setting unit 20' does not determine that there are two interchanges indicated by the interchange information (NO at Step S600), the process moves to Step S520 after outputting an error message or the like. At Step S640, the guide route search unit 19 changes the search condition in the object road section according to the search condition indicated by the search condition information output from the search condition setting unit 20', and searches for the second guide route from the vehicle location to the destination (Step S640). At last, the guide route guidance unit 22 starts the guidance of the second guide route based on the vehicle location information detected by the vehicle location detection unit 12, the map data stored in the map data storage unit 13, and the second guide route information stored in the guide route memory 21 (Step S660). By completing the process at Step S660, the navigation apparatus 100' terminates the process shown in FIG. 7.

In the navigation system 100' described above with respect to FIGS. 4-7, the expressway guide image showing the traffic jam conditions of road sections among a plurality of interchanges on the expressway ahead of the current location selected by the operation received by the operation reception unit 18' in the order of closeness to the current location is displayed together with the map image during the guidance of the open road included in the guide route from the current location of the vehicle to the destination. Then, based on the tracing operation performed on the touch screen 15*b* by the user while the map image and the expressway guide image are displayed, the search condition in the object road section for which the search condition used to search for the second guide route from the current location to the destination is set, and the second guide route is searched in accordance with the set search condition.

In the navigation system 100' described above with respect to FIGS. 4-7, the change of the search condition and the setting of the road section to which the changed search condition is applied can be automatically performed by the user only performing the simple operation on the touch screen 15*b* (the operation to select an expressway and the tracing operation to specify an interchange) while travelling on the open road. Thus, the route preferred by the user can be searched without performing such a troublesome user operation as with the guide route change function in the past, and the currently shown guide route can be changed to the preferred guide route by the simple operation.

Although the example of displaying the expressway guide image in a case of receiving an operation to select any one from among a plurality of expressways during the guidance of the open road included in the guide route from the current location of the vehicle to the destination was explained in the navigation system 100' above with respect to FIGS. 4-7, the present invention is not limited to this embodiment. For example, during the guidance of the open road included in the guide route from the current location of the vehicle to the destination, the closest one of expressways within a predetermined distance from the current location may be searched for based on the map data, and the expressway guide image associated with the searched expressway may be displayed in response to the user's request (operation to request display of the expressway guide image). In this manner, the expressway guide image based on the closest expressway from the current location is displayed without the user selecting the expressway, thereby reducing trouble to display the expressway guide image to change the guide route during the guidance of the open road included in the guide route from the current location of the vehicle to the destination.

A functional configuration of a navigation apparatus 100" in this case is explained below. FIG. 8 is a block diagram showing an exemplary modification of the functional configuration of the navigation apparatus 100' described above with respect to FIGS. 4-7. As shown in FIG. 8, the navigation apparatus 100" further includes an expressway search unit 25 in addition to the configuration shown in FIG. 4 as the functional configuration. Furthermore, the navigation apparatus 100" includes an operation reception unit 18" and a guide image generation unit 24" respectively as the functional configuration instead of the operation reception unit 18' and the guide image generation unit 24' shown in FIG. 4. In FIG. 8, the constituents denoted by the same reference numerals as in FIG. 4 have the same functions as those shown in FIG. 4, and therefore, the explanation thereof is omitted.

The operation reception unit 18″ receives an operation to request the display of the expressway guide image during the guidance of the open road included in the guide route from the current location of the vehicle to the destination. The operation reception unit 18″ then notifies the expressway search unit 25 of having received the operation to request the display of the expressway guide image.

In a case of receiving a notification of having received the operation to request the display of the expressway guide image from the operation reception unit 18″, the expressway search unit 25 searches for the closest one of expressways within a predetermined distance (for example, 10 km) from the current location based on the vehicle location information detected by the vehicle location detection unit 12 and the map data stored in the map data storage unit 13. The expressway search unit 25 then outputs the expressway information indicative of the searched expressway to the guide image generation unit 24″.

When the expressway information is output from the expressway search unit 25, the guide image generation unit 24″ generates the expressway guide image data showing the traffic jam conditions of road sections among a plurality of interchanges on the expressway indicated by the expressway information in the order of closeness to the current location based on the vehicle location information detected by the vehicle location detection unit 12, the map data stored in the map data storage unit 13, and the traffic jam information obtained by the traffic jam information obtaining unit 23. The guide image display control unit 17 then outputs the expressway guide image data generated by the guide image generation unit 24″ to the display unit 15 to display the expressway guide image on the display panel 15*a*.

Furthermore, in the navigation systems described above, the operation reception unit 18 (18′, 18″) may be configured to receive a direction input operation performed on the touch screen 15*b* by the user, and the guide image display control unit 17 may be configured to perform a control to display the plurality of road sections to be displayed on the expressway guide image by scrolling the screen in the direction specified by the direction input operation received by the operation reception unit 18 (18′, 18″).

FIGS. 9(*a*) to 9(*e*) are schematics illustrating examples of displaying the road sections among the plurality of interchanges to be displayed on the expressway guide image by scrolling the screen. FIG. 9(*a*) is a simplified schematic illustrating an expressway guide image showing road sections among three interchanges (IC1, IC2, and IC3) in the order of closeness to the current location. FIG. 9(*b*) illustrates an expressway guide image to be displayed when the direction input operation performed on the touch screen 15*b* by the user is received while the expressway guide image shown in FIG. 9(*a*) is displayed.

As shown in FIGS. 9(*a*) and 9(*b*), by the tracing operation performed on the touch screen 15*b* following an arrow in each of FIGS. 9(*a*) and 9(*b*) with the user's finger, the operation reception unit 18 (18′, 18″) receives the direction input operation performed by the user. During the direction input operation, when the user's finger reaches a point higher than the interchange (IC3), a scrolling of the road sections among the interchanges automatically starts. As a result, in the expressway guide image shown in FIG. 9(*b*), the road sections among the three interchanges (IC1, IC2, and IC3) displayed on the expressway guide image are scrolled in the direction specified by the direction input operation (upward).

As described above, by scrolling the plurality of road sections displayed on the expressway guide image in the direction specified by the direction input operation, road sections in which the search condition is to be changed can be set to include a range that cannot be displayed on the display panel 15*a* (in the example shown in FIGS. 9(*a*) and 9(*b*), the road sections to avoid the traffic jam: IC1 to IC4).

Moreover, in the navigation systems described above, the guide image display control unit 17 may be configured to perform a control to display road sections located within a jammed section to be shorter than road sections located outside the jammed section among the plurality of road sections displayed on the expressway guide image based on the traffic jam information obtained by the traffic jam information obtaining unit 23. It is preferable to compress the jammed section so that an end of the jammed section can be displayed on the screen. An example of this case is shown in FIG. 9(*c*). As shown in FIG. 9(*c*), in the expressway guide image, each of the road sections located within the jammed section (road sections between IC1 and IC4) is displayed to be shorter than the road section located outside the jammed section (road section between IC4 and IC5) among the road sections among five interchanges on the expressway. In this manner, in a case where the jammed section is long as shown in FIGS. 9(*a*) and 9(*b*), the object road section for avoiding the traffic jam can be specified without scrolling the screen.

Although the object road section is set by the tracing operation performed on the touch screen 15*b* by the user in the first and second embodiments described above, the present invention is not limited to these embodiments. For example, the object road section may be set by a touch operation performed on the touch screen 15*b* by the user. Specifically, the object road section may be set by touching one or two of the spot name display areas displayed on such an expressway guide image as shown in FIGS. 2(*a*), 2(*b*), 6(*a*), and 6(*b*).

In FIG. 2(*a*), the object road section may be set by the touch operation on the spot name display area 200 and the spot name display area 220 instead of the tracing operation following the arrow with the user's finger 320. In FIG. 2(*b*), the object road section may be set by the touch operation on the spot name display area 200 instead of the tracing operation following the arrow with the user's finger 320. In FIG. 6(*a*), the object road section may be set by the touch operation on the spot name display area 660 instead of the tracing operation following the arrow with the user's finger 760. In FIG. 6(*b*), the object road section may be set by the touch operation on the spot name display area 840 and the spot name display area 880 instead of the tracing operation following the arrow with the user's finger 960.

Although the expressway guide image is used as an example of the traffic jam guide image in the navigation systems described above, the present invention is not limited to the expressway guide image. For example, the traffic jam guide image may be an indicator image indicative of the traffic jam conditions of a plurality of road sections including jammed sections and non-jammed sections present between the current location and the destination in the form of a bar graph. An example of this case is shown in FIG. 9(*d*). The indicator image shown in FIG. 9(*d*) is, for example, displayed below the map image during the guidance of the guide route.

In the indicator image, a reference numeral 1000 denotes a current location of the vehicle, 1140 denotes a destination, and reference numerals 1020, 1040, 1060, 1080, 1100, and 1120 denote road sections that form a guide route from the current location 1000 to the destination 1140 (any one of an open road and an expressway). In the example shown in FIG. 9(*d*), the traffic is jammed in the road sections 1020, 1060, and 1100. In this case, the search condition setting unit 20′ determines the road section 1020 to be the object road section by the tracing operation following an arrow with a user's finger 1160 (an operation of tracing from the current location 1000 to the road section 1040 avoiding the jammed road section 1020), and sets the search condition in the determined object road section (search condition to bypass the road section 1020). For example, the search condition to bypass the road section 1020 can be setting a link cost of the guide route in the road section 1020 to infinity.

Figure 9A:
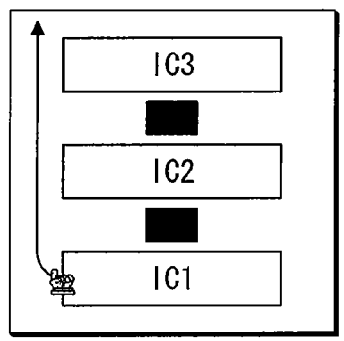
FIGS. 9(a) to 9(e) are schematics illustrating exemplary modifications of the expressway guide image according to the embodiments of FIGS. 1 and 4.
Figure 9B:
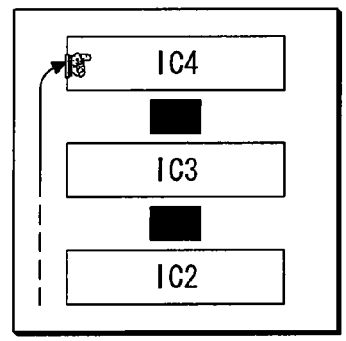
Figure 9C:
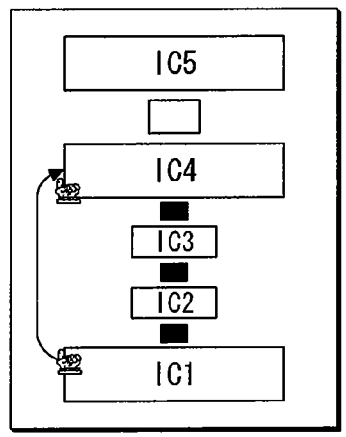
Figure 9D:
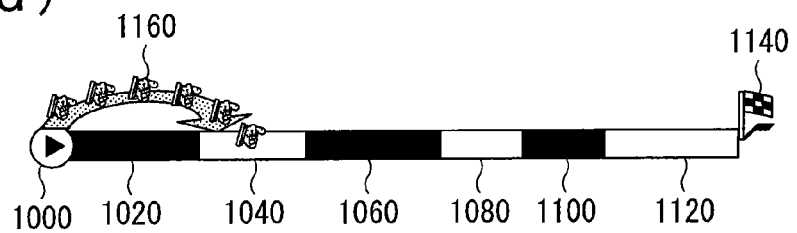
Figure 9E:
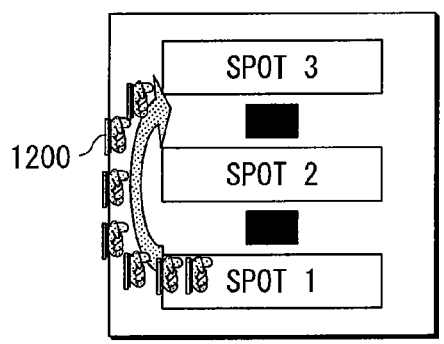

Furthermore, in the navigation system described above with respect to FIGS. 4-7, the traffic jam guide image may show the traffic jam conditions of road sections among a plurality of spots on an open road included in the guide route (for example, an intersection at which the vehicle should turn left or right, an intersection of main roads, and the like) arranged in the order of closeness to the current location. An example of this case is shown in FIG. 9(e). As shown in FIG. 9(e), in the traffic jam guide image, the traffic jam conditions of road sections among three spots on an open road are arranged in the order of closeness to the current location. In the example shown in FIG. 9(e), the traffic is jammed in a road section between a spot 1 and a spot 2 and a road section between the spot 2 and a spot 3. In this case, the search condition setting unit 20' determines the road sections between the spot 1 and the spot 3 to be the object road section by the tracing operation following an arrow with a user's finger 1200 (an operation of tracing from the spot 1 to the spot 3 avoiding the jammed sections around the spot 2), and sets the search condition in the determined object road section (search condition to bypass the object road section). For example, the search condition to bypass the object road section can be setting the link cost of the guide route in the object road section to infinity.

It should be understood that the embodiments of the navigation system described above are only examples for carrying out the present invention, and that the technical scope of the present invention should not be limited to these embodiments. In other words, the present invention can be carried out in various ways without departing from the spirit or the principal features of the present invention. It is therefore intended that the foregoing detailed description be regarded as illustrative rather than limiting, and that it be understood that it is the following claims, including all equivalents, that are intended to define the spirit and scope of this invention.

What is claimed is:

1. A navigation apparatus comprising:
   a traffic jam information obtaining unit configured to obtain traffic jam information;
   a display control unit configured to perform a control to display a traffic jam guide image showing traffic jam conditions of a plurality of road sections ahead of a current location of a vehicle in an order of closeness to the current location together with a map image based on the traffic jam information obtained by the traffic jam information obtaining unit during a guidance of a guide route from the current location to a destination;
   an operation reception unit configured to receive an operation performed on a touch screen by a user when the map image and the traffic jam guide image are displayed by the display control unit;
   a search condition setting unit configured to, based on the operation received by the operation reception unit, determine a road section for which a search condition is to be changed, to set the determined road section as an object road section, and to set the search condition in the object road section; and
   a guide route search unit configured to change the search condition in the object road section according to the search condition set by the search condition setting unit and then search for a second guide route from the current location to the destination;
   wherein the plurality of road sections displayed on the traffic jam guide image are the road sections among a plurality of interchanges on an expressway included in the guide route, and wherein in a case where one of the interchanges is specified by the operation received by the operation reception unit among the plurality of interchanges, the search condition setting unit is configured to determine the road section from the specified interchange to the destination to be the object road section and is configured to set the search condition in the determined object road section to prefer open roads.

2. The navigation apparatus according to claim 1, wherein:
   the operation reception unit is configured to receive a direction input operation performed on the touch screen by the user, and
   the display control unit is configured to perform a control to display the plurality of road sections to be displayed on the traffic jam guide image by scrolling a screen in a direction specified by the direction input operation received by the operation reception unit.

3. The navigation apparatus according to claim 1, wherein the display control unit is configured to perform a control to display a road section located in a jammed section to be shorter than a road section located outside the jammed section among the plurality of road sections to be displayed on the traffic jam guide image based on the traffic jam information obtained by the traffic jam information obtaining unit.

4. The navigation apparatus according to claim 1, wherein the traffic jam guide image is an indicator image indicative of the traffic jam conditions of the plurality of road sections including jammed sections and non-jammed sections present between the current location and the destination in a form of a bar graph.

5. The navigation apparatus according to claim 1, wherein:
   the operation reception unit is configured to receive a tracing operation performed on the touch screen by the user, and
   the search condition setting unit is configured to determine the object road section based on the tracing operation received by the operation reception unit and configured to set the search condition in the determined object road section.

6. The navigation apparatus according to claim 1, further comprising:
   an expressway selection operation receiving unit configured to receive an operation to select any one of a plurality of expressways when the current location is not located on an expressway,
   wherein the plurality of road sections displayed on the traffic jam guide image are the road sections among a plurality of interchanges on the expressway selected by the operation received by the expressway selection operation receiving unit.

7. The navigation apparatus according to claim 1, further comprising:
   an expressway search unit configured to search for a closest expressway from among expressways present within a predetermined distance from the current location based on map data in response to a request from the user in a case where the current location is not located on the expressway, wherein the plurality of road sections displayed on the traffic jam guide image are the road sections among a plurality of interchanges on the expressway searched by the expressway search unit.

8. A navigation apparatus comprising:
a traffic jam information obtaining unit configured to obtain traffic jam information;
a display control unit configured to perform a control to display a traffic jam guide image showing traffic jam conditions of a plurality of road sections ahead of a current location of a vehicle in an order of closeness to the current location together with a map image based on the traffic jam information obtained by the traffic jam information obtaining unit during a guidance of a guide route from the current location to a destination;
an operation reception unit configured to receive an operation performed on a touch screen by a user when the map image and the traffic jam guide image are displayed by the display control unit;
a search condition setting unit configured to, based on the operation received by the operation reception unit, determine a road section for which a search condition is to be changed, to set the determined road section as an object road section, and to set the search condition in the object road section; and
a guide route search unit configured to change the search condition in the object road section according to the search condition set by the search condition setting unit and then search for a second guide route from the current location to the destination;
wherein the plurality of road sections displayed on the traffic jam guide image are the road sections among a plurality of interchanges on an expressway not included in the guide route, and wherein in a case where one of the interchanges is specified by the operation received by the operation reception unit among the plurality of interchanges, the search condition setting unit is configured to determine the road section from the specified interchange to the destination to be the object road section and is configured to set the search condition in the determined object road section to prefer expressways.

9. A navigation apparatus comprising:
a traffic jam information obtaining unit configured to obtain traffic jam information;
a display control unit configured to perform a control to display a traffic jam guide image showing traffic jam conditions of a plurality of road sections ahead of a current location of a vehicle in an order of closeness to the current location together with a map image based on the traffic jam information obtained by the traffic jam information obtaining unit during a guidance of a guide route from the current location to a destination;
an operation reception unit configured to receive an operation performed on a touch screen by a user when the map image and the traffic jam guide image are displayed by the display control unit;
a search condition setting unit configured to, based on the operation received by the operation reception unit, determine a road section for which a search condition is to be changed, to set the determined road section as an object road section, and to set the search condition in the object road section; and
a guide route search unit configured to change the search condition in the object road section according to the search condition set by the search condition setting unit and then search for a second guide route from the current location to the destination;
wherein the plurality of road sections displayed on the traffic jam guide image are the road sections among a plurality of interchanges on an expressway not included in the guide route, and wherein in a case where two of the interchanges are specified by the operation received by the operation reception unit among the plurality of interchanges, the search condition setting unit is configured to determine the road section between the two specified interchanges to be the object road section and is configured to set the search condition in the determined object road section to prefer expressways.

10. A guide route search method comprising:
obtaining traffic jam information;
performing a control to display a traffic jam guide image showing traffic jam conditions of a plurality of road sections ahead of a current location of a vehicle in an order of closeness to the current location together with a map image based on the traffic jam information obtained during a guidance of a guide route from the current location to a destination, wherein the plurality of road sections displayed on the traffic jam guide image are the road sections among a plurality of interchanges on an expressway included in the guide route;
receiving an operation performed on a touch screen by a user when the map image and the traffic jam guide image are displayed;
determining a road section for which a search condition is to be changed, setting the determined road section as an object road section, and setting the search condition in the object road section based on the operation received on the touch screen; and
changing the search condition in the object road section according to the search condition set as the object road section and searching for a second guide route from the current location to the destination;
wherein in a case where one of the interchanges is specified by the operation among the plurality of interchanges, the road section from the specified interchange to the destination is determined to be the object road section and the search condition in the determined object road section is set to prefer open roads.

11. A guide route search method comprising:
obtaining traffic jam information;
performing a control to display a traffic jam guide image showing traffic jam conditions of a plurality of road sections ahead of a current location of a vehicle in an order of closeness to the current location together with a map image based on the traffic jam information obtained during a guidance of a guide route from the current location to a destination, wherein the plurality of road sections displayed on the traffic jam guide image are the road sections among a plurality of interchanges on an expressway not included in the guide route;
receiving an operation performed on a touch screen by a user when the map image and the traffic jam guide image are displayed;
determining a road section for which a search condition is to be changed, setting the determined road section as an object road section, and setting the search condition in the object road section based on the operation received on the touch screen; and
changing the search condition in the object road section according to the search condition set as the object road section and searching for a second guide route from the current location to the destination;

wherein in a case where one of the interchanges is specified by the operation received by the operation reception unit among the plurality of interchanges, the road section from the specified interchange to the destination is determined to be the object road section and the search condition in the determined object road section is set to prefer expressways.

12. A guide route search method comprising:

obtaining traffic jam information;

performing a control to display a traffic jam guide image showing traffic jam conditions of a plurality of road sections ahead of a current location of a vehicle in an order of closeness to the current location together with a map image based on the traffic jam information obtained during a guidance of a guide route from the current location to a destination, wherein the plurality of road sections displayed on the traffic jam guide image are the road sections among a plurality of interchanges on an expressway not included in the guide route;

receiving an operation performed on a touch screen by a user when the map image and the traffic jam guide image are displayed;

determining a road section for which a search condition is to be changed, setting the determined road section as an object road section, and setting the search condition in the object road section based on the operation received on the touch screen; and changing the search condition in the object road section according to the search condition set as the object road section and searching for a second guide route from the current location to the destination;

wherein in a case where two of the interchanges are specified by the operation received by the operation reception unit among the plurality of interchanges, the road section between the two specified interchanges is determined to be the object road section and the search condition in the determined object road section is set to prefer expressways.

\* \* \* \* \*